United States Patent
Smith et al.

(10) Patent No.: US 6,398,966 B1
(45) Date of Patent: Jun. 4, 2002

(54) METHOD FOR REMOVING OIL FROM WATER INCLUDING MONITORING OF ADSORBENT SATURATION

(75) Inventors: Jeffrey J. Smith, New Orleans, LA (US); Jerald W. Darlington, Jr., Marengo, IL (US); Michael R. Johnson; John Occhipinti, both of Mandeville, LA (US); Elmo Robichaux, Cut Off, LA (US); Michael A. Berger, New Orleans, LA (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/925,898

(22) Filed: Aug. 9, 2001

Related U.S. Application Data

(60) Division of application No. 09/706,130, filed on Nov. 3, 2000, which is a continuation-in-part of application No. 09/352,457, filed on Jul. 13, 1999, now Pat. No. 6,235,201, which is a continuation-in-part of application No. 09/081,976, filed on May 14, 1998, now Pat. No. 5,935,444.

(51) Int. Cl.[7] .................................................. C02F 1/28
(52) U.S. Cl. ........................ 210/691; 210/662; 210/746; 210/804; 210/808; 210/924
(58) Field of Search ................................. 210/112, 170, 210/252, 264, 266, 282, 287, 288, 502.1, 691, 662, 663, 746, 747, 800, 804, 808, 924; 166/357; 205/787; 73/61.41

(56) References Cited

U.S. PATENT DOCUMENTS

| | | | |
|---|---|---|---|
| 2,531,427 A | 11/1950 | Hauser | 260/448 |
| 2,692,683 A | 10/1954 | Mason | 210/148 |
| 3,458,047 A | 7/1969 | White | 210/282 |
| 3,733,267 A | 5/1973 | Haase | 210/669 |

(List continued on next page.)

FOREIGN PATENT DOCUMENTS

| | | |
|---|---|---|
| EP | 0 787 688 A1 | 8/1997 |
| JP | 5-329302 | 12/1993 |
| WO | WO 82/02496 | 8/1982 |
| WO | WO 83/01205 | 4/1983 |
| WO | WO 88/10142 | 12/1988 |
| WO | WO 95/24963 | 9/1995 |
| WO | WO 99/58218 | 11/1999 |

OTHER PUBLICATIONS

L.G. Berry et al. "Mineralogy," W.H. Freeman and Company (4 pages).

*Primary Examiner*—Duane Smith
*Assistant Examiner*—Frank M. Lawrence
(74) *Attorney, Agent, or Firm*—Marshall, Gerstein & Borun.

(57) ABSTRACT

Apparatus in fluid communication with a water leg portion of a hydrocarbon-contaminated water, e.g., a water leg portion of an offshore drilling or production platform sump tank for conveying water, separated from oil, into contact with organophilic media canisters such that the hydrocarbons and other organic materials commingled with the sump tank water will be adsorbed onto the organophilic media and detected by the embedded probe in selected canisters. The canisters are provided in a plurality of stacks and are in fluid communication with a header disposed at the bottom of the vessel housing the various stacks of canisters. Solids that do not pass through the canisters are accumulated at the bottom of the vessel and easily drained through a drain port. The water will pass through the media and will be conveyed back to the ocean water without contamination. At some point in time, the organophilic media will become "spent" and at a certain "spent level", the saturated condition of the organomedia will be electronically detected by the embedded probe and alarm/control panel. The alarm indicates that the "spent" organophilic media should be replaced with fresh media or the spent media regenerated.

14 Claims, 8 Drawing Sheets

U.S. PATENT DOCUMENTS

| | | | |
|---|---|---|---|
| 3,869,382 A | 3/1975 | Tajeda | 210/85 |
| 4,428,841 A | 1/1984 | Favret, Jr. | 210/747 |
| 4,609,458 A | 9/1986 | Okamura et al. | 210/85 |
| 4,678,577 A | 7/1987 | Thomas et al. | 210/441 |
| 4,821,800 A | 4/1989 | Scott et al. | 166/228 |
| 4,839,040 A | 6/1989 | Alm | 210/167 |
| 4,872,991 A | 10/1989 | Bartels et al. | 210/651 |
| 4,894,149 A | 1/1990 | Block | 210/101 |
| 5,161,619 A | 11/1992 | Bollich | 166/357 |
| 5,234,601 A | 8/1993 | Janke et al. | 210/662 |
| 5,286,383 A | 2/1994 | Verret et al. | 210/521 |
| 5,474,672 A | 12/1995 | Peterson et al. | 210/85 |
| 5,567,318 A | 10/1996 | Beall | 210/691 |
| 5,707,527 A | 1/1998 | Knutson et al. | 210/660 |
| 6,077,423 A | 6/2000 | Roy et al. | 210/121 |
| 6,235,201 B1 | 5/2001 | Smith et al. | 210/691 |

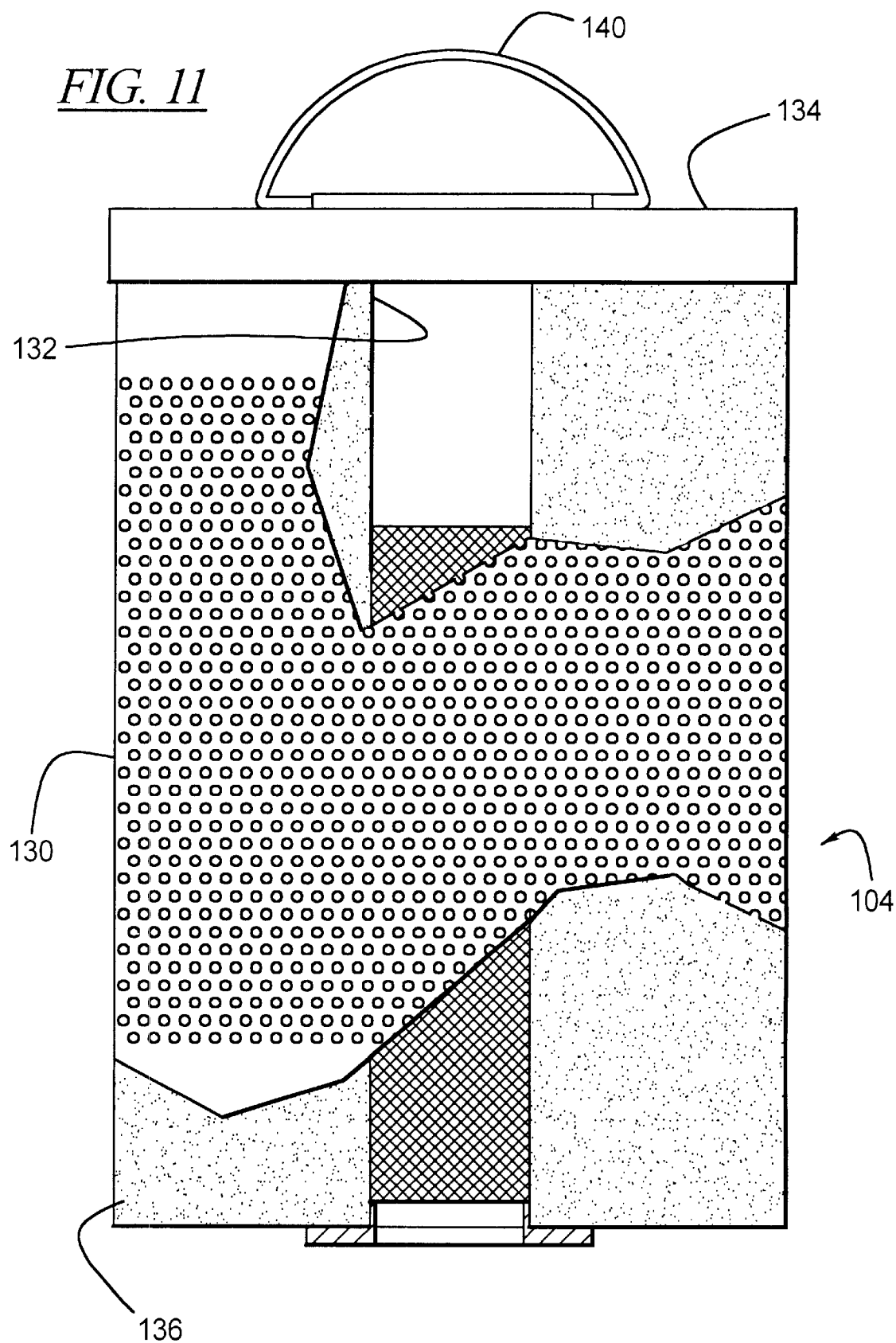

METHOD FOR REMOVING OIL FROM WATER INCLUDING MONITORING OF ADSORBENT SATURATION

CROSS REFERENCE TO RELATED APPLICATIONS

This application is a divisional of U.S. application Ser. No. 09/706,130, filed Nov. 3, 2000, still pending, which is a continuation-in-part of U.S. application Ser. No. 09/352,457, filed Jul. 13, 1999, now U.S. Pat. No. 6,235,201, which is a continuation-in-part of U.S. application Ser. No. 09/081,976, filed May 14, 1998, now U.S. Pat. No. 5,935,444.

FIELD OF THE INVENTION

The present invention is directed to an apparatus and method for removing oil, hydrocarbons and other organic materials from water, particularly industrial waste waters, ship bilge pump waters, produced water and rainwater collected on offshore oil drilling and production platforms, by adsorption with an oil adsorbent, while electronically monitoring the adsorbent with an embedded probe to determine when the adsorbent needs replacement. More particularly, the present invention is directed to an apparatus and method that includes relatively crude, gravity separation of oil from the water and then contacting the separated water, containing a small amount of hydrocarbons, such as oil and grease, with an organophilic clay to purify the water. During adsorption of the hydrocarbons, the adsorbent is monitored, by the probe, to determine when the absorbent is saturated and should be replaced or regenerated. Further, the present invention is directed towards an improved vessel for housing a plurality of cartridges of the organophilic clay with a removable header for directing filtered water out of the vessel.

BACKGROUND OF THE INVENTION AND PRIOR ART

Offshore drilling and production platforms used for recovering oil from subterranean formations disposed beneath ocean water includes a number of structural support legs for supporting a plurality of work deck areas at substantial heights above the water level, e.g., disposed from 40 to 100 or more feet above sea level. During the recovery of oil at one or more of these work deck areas, oil, grease and other hydrocarbons are unavoidably spilled onto the deck area(s) and it is not permissible to discard these hydrocarbons into the ocean water. Such work deck areas or platform surfaces are constructed to be fluid-impermeable in order to contain the spilled hydrocarbons on the work deck areas. These hydrocarbons, such as recovered oil, grease, surfactants and other organic contaminants, are directed from the work deck or platform areas, either by water washing or rainwater, into a sump pump container or sump tank where the water and oil separate by gravity so that the water can be removed from a lower portion of the sump tank, for conveyance back to the ocean, and the oil can be pumped from an upper portion of the sump tank into an oil recovery container so that the oil is not returned to the ocean.

These contained deck areas on offshore structures collect a significant amount of water during periods of high rainfall. The rainwater and entrained hydrocarbons, particularly recovered oil, grease and surfactants, are conveyed to the sump tank or collection tank through a gravity drain system from each of the work deck areas. These sump tanks rely on retention time as the primary oil/water separation mechanism in order to skim the lighter density hydrocarbons from a top of the sump tank so that the water can be returned to the ocean.

The sump tanks presently used on offshore platforms suffer from a number of major drawbacks which result in significant amounts of hydrocarbons, particularly oil, paraffins, grease, and refined hydrocarbons being returned to the ocean causing significant ecological contamination. One major drawback of the presently used sump tanks is that they are designed for a maximum of about three inches of rainwater per hour. It has been found that it is not uncommon to experience eight to ten inches of rainfall per hour in areas such as the Gulf of Mexico. Another major drawback of the sump tanks presently used on offshore drilling platforms is that a tank containing a layer of oil disposed above a layer of water will lose the water by evaporation over an extended dry period and the oil layer, as a result, will coat the inside surfaces of the sump tank. This phenomena is known in the art as sheening. As a result of the sump tank sheening, water generated from even a modest rain shower, after this drying period, carries the oil through a water leg or drain portion of the sump tank as the water initially washes lower inner surfaces of the sump tank, thereby carrying the oil to the ocean.

Another water treatment problem associated with offshore oil platforms is the treatment of the aqueous solutions used in acid fracturing processes. Specifically, acidic solutions are commonly pumped down under pressure to cause fractures in the oil producing regions of the formation. As these acidic solutions are returned to the surface, they are often contaminated with oil or hydrocarbons. As discussed above with respect to rainwater, the hydrocarbons must be removed from the solutions before the water is returned to the ocean.

Another problem associated with all auxiliary equipment used on oil platforms is the need for equipment to be designed in a space efficient manner. Specifically, auxiliary equipment, including water treatment equipment, must be designed in as space efficient manner as possible because horizontal square footage on an oil platform is scarce. Therefore, there is a need for water treatment equipment that can treat water at a fast rate, but which is also space efficient.

SUMMARY OF THE INVENTION

In accordance with one embodiment of the present invention, an improved apparatus is provided for separating hydrocarbons from a liquid containing water and hydrocarbons. The apparatus includes an improved vessel design. The vessel includes an inlet for conveying contaminated water into the vessel and an outlet for transporting treated water out of the vessel. A removable header is connected to the outlet and housed within the vessel. Permeable conduits are connected to the header and extend upward therefrom. Cartridges containing organophilic media for adsorbing hydrocarbons are then stacked on the permeable conduits. Each cartridge includes a permeable outer cover, a permeable inner tube with the organophilic media disposed therebetween. A pressure drop is provided between the vessel inlet and the vessel outlet, and therefore between the vessel inlet and the permeable conduits. As a result, the contaminated liquid flows radially inwardly through the outer cover of the cartridges, through the media and through the inner tube of the cartridge before flowing into the conduit. Intimate contact between the media and the contaminated liquid results in adsorption of the hydrocarbon contaminants on the media. The header is detachably connected to the treated liquid outlet thereby facilitating removal of the header for replacement or servicing. Accumulated solids, which do not pass through the cartridges, are conveniently collected at the bottom of the vessel and can be flushed out through a drain valve.

In accordance with another aspect of the present invention, an improved method of manufacturing such a vessel is provided. A bottom structure is welded to an open bottom end of a hollow cylinder. The bottom structure includes a drain outlet with a valve disposed exterior to the bottom structure for opening and closing the drain outlet. The bottom structure also includes a treated liquid outlet with an inner end disposed inside the bottom structure. The inside surfaces of the bottom structure and the cylinder are coated with a protective coating to resist corrosion in the presence of salt water and very acidic or basic solutions. A header is connected to the inner end of the liquid outlet and contained within the bottom structure of the vessel. Permeable conduits are then connected to the header and extend upward through the cylindrical section of the vessel. Cartridges, like those described above, are placed singly or are stacked one on top of another with the permeable conduits extending through the inner tubes of the cylindrical cartridges. The improved method enables the weld connecting the bottom structure to the bottom end of the cylinder to be easily coated with the protective coating. Further, because a header is employed, the bottom of the vessel may be used to accumulate solids that do not pass through the cartridges and, because the bottom of the vessel is not needed to collect treated water, a greater portion of the height of the vessel is utilized for cartridges thereby increasing the treatment capacity of each vessel.

In accordance with another embodiment of the present invention, an apparatus and method are provided for treating or polishing an organic compound-containing waste water with a contained volume of organophilic media wherein the organophilic media degrades with time due to continued adsorbance of the organic compound(s) from the waste water onto the media.

In accordance with a preferred embodiment, the preferred media is an organophilic clay and the contained volume of organophilic clay includes a probe disposed within the clay-containing vessel, in contact with the organophilic clay, for monitoring an electrical property of the organophilic clay, preferably by monitoring the electrical conductance or electrical resistance of the organophilic clay and the electrical probe, to obtain a visual or audible signal when it is time to regenerate or replace the organophilic clay (before the organophilic clay has adsorbed so much organic material that its capacity for further adsorbance of organics is insufficient to provide effluent water of sufficient purity). It is anticipated that radio frequency or ultrasonic monitoring of the waste water being treated will serve as suitable substitutes for electrical conductance or resistance measurements.

In accordance with another embodiment of the present invention, the above-described drawbacks of a sump tank system for separation of water from oils and other hydrocarbons have been eliminated by the apparatus and method of the present invention wherein the sump tank water is conveyed for contact with an organophilic media for final separation of hydrocarbons such as oil and paraffins from the water collected on work deck areas of an offshore drilling platform, preferably while the organophilic media is monitored so that it can be replaced before it becomes ineffective.

In brief, one aspect of the present invention is an improved vessel design for accommodating organophilic cartridges in a more space efficient manner. Specifically, the improved vessel design includes an inlet and an outlet. A header is connected to the outlet and disposed inside the vessel near the bottom thereof. The header is connected to one or more permeable conduits that extend upward therefrom. Organophilic media cartridges can then be stacked on the permeable conduits. A pressure drop between the inlet and the outlet causes the contaminated liquid to flow radially inwardly through the permeable outer covers of the cartridges, through the media, through the permeable inner tubes of the cartridges and into the permeable conduits. Because intimate contact between the media and liquid results in adsorption of the hydrocarbon contaminate on the media, treated water passes through the inner tubes of the cartridges and into the permeable conduits. The treated water then flows down through the conduits, through the header and out of the vessel through the outlet.

Another aspect of the present invention is to provide a removable header connected to the treated fluid outlet and disposed inside the vessel. By enabling the header to be removable, the header may be removed and/or replaced when necessary. The employment of a header avoids the use of the bottom of the vessel for collecting treated fluid and thereby enables a greater proportion of the height of the vessel to be used for stacked filter cartridges thereby increasing the capacity of each vessel while not increasing the horizontal footprint of the vessel.

Another aspect of the present invention is directed toward an improved method for manufacturing vessels for accommodating organophilic cartridges for treating hydrocarbon-contaminated water.

Another aspect of the present invention is directed toward a method of manufacturing an apparatus for separating hydrocarbons from a water/hydrocarbon mixture. The manufacturing method includes the steps of providing a hollow cylinder having an open top end, an open bottom end and an inside surface, welding a bottom structure to the bottom end of the cylinder to enclose the bottom end of the cylinder. The bottom structure includes an inside surface with a drain outlet with a valve disposed exterior to the bottom structure for opening and closing the drain outlet. The bottom structure also includes a treated water outlet which has an inner end disposed inside the bottom structure. The method further includes the steps of coating the inside surface of the bottom structure and the inside surface of the cylinder with a protective coating, connecting a header to the inner end of the treated water outlet, connecting at least one permeable conduit to the header, and placing at least one cartridge on the conduit. The cartridge includes a permeable outer cover and a permeable inner tube through which the conduit extends. The cartridge contains an organophilic media between the outer cover and the inner tube. Intimate contact between the media and liquid results in adsorption of the hydrocarbon in the liquid on the media. Finally, the method includes the steps of attaching a removable top structure on the top end of the cylinder.

Yet another aspect of the present invention is directed toward a method of separating water from a liquid that comprises a combination of water and a hydrocarbon contaminate. The separation method includes the step of flowing the liquid into a vessel that includes an outlet, a header connected to the outlet and at least one permeable conduit connected to the header. The conduit passes through a plurality of cylindrical cartridges. Each cartridge includes a permeable outer cover, a permeable inner tube and contains an organophilic media between the outer cover and inner tube. The method further includes the step of providing a negative pressure gradient between a portion of the vessel exterior to the cartridges and the inside of the permeable conduit thereby causing the liquid to flow radially inwardly through the outer cover of each cartridge, through the media and through the inner tube before flowing into the conduit.

Another aspect of the present invention is directed to an apparatus for monitoring adsorbance capacity of an organophilic media by monitoring, continuously or periodically, a property of the liquid being treated by the organophilic media, particularly the electrical conductance or electrical resistance of the liquid being treated. The liquid being treated by the organophilic media for removal of hydrocarbons therefrom can be an industrial waste water, ship bilge pump water, produced water, or, in a preferred embodiment, sump tank water collected on offshore drilling platforms (hereinafter collectively referred to as "waste water"). The organophilic media preferably is electronically monitored to provide a recognizable audible or visual signal, preferably an alarm, to indicate when the organophilic media should be regenerated or replaced.

Another aspect of the present invention is to provide an improved probe for monitoring the organophilic clay when organophilic clay is used as the organophilic media. A probe in accordance with the preferred embodiment of the present invention is disposed within one of the cartridges and includes two spaced apart elements for monitoring a property of the liquid flowing through the clay.

The elements preferably are aligned transversely to the radially inward flow of the liquid through the clay. A convenient property to measure is either the conductivity or resistivity of the fluid by applying a voltage across the two spaced apart elements. An increase in the resistivity or a decrease in the conductivity of the organophilic clay will serve as an indication that the organophilic clay contains hydrocarbon and therefore the organophilic clay needs to be regenerated or replaced. The probe should be placed within the canister and adjacent to the inner tube of the canister as saturation of the organophilic clay will begin from the outside or adjacent to the permeable cover of the canister and proceed inward towards the inner tube.

Another aspect of the present invention is to provide an improved organophilic media canister for separating hydrocarbon contaminate from water that provides an indication as to when the organophilic media has become saturated with hydrocarbon and therefore needs to be replaced or regenerated. The filter canister of the present invention includes an outer cylindrical permeable cover, an inner cylindrical permeable tube, an annular bottom connecting bottom edges of the outer cover to the inner tube, an annular top connecting top edges of the outer cover to the inner tube and, in a preferred embodiment, includes a probe connected between the inner tube and the outer cover, preferably connected to one of the annular top or annular bottom at a middle position. The probe includes two spaced apart elements. The spaced apart elements are each connected to a wire lead. Each wire lead is connected to a control panel. The elements preferably are aligned transversely to a radial flow from the outer cover to the inner tube or, in other words, transversely to a radius defined by a common axis of the outer cover and the inner tube and which extends between the two spaced apart elements. Finally, the filter cartridge includes organophilic media disposed in the space defined by the inner tube, the outer cover, the annular top and the annular bottom. The organophilic media surrounds the probe and comes in intimate contact with liquid flowing through the canister.

Another aspect of the present invention is to provide a method of monitoring the changing adsorbance capacity of a contained volume of organophilic media that is being used to treat an organic compound-containing waste water for removal of organic compounds therefrom such that a visible or audible signal is provided as an indication of when to regenerate or replace the organophilic media.

Another aspect of the present invention is to provide a new and improved method and apparatus for complete separation of oil from water admixed on an offshore oil well drilling platform so that the separated water can be returned to the ocean without ocean contamination, with an oil adsorbent, such as an organophilic media, while monitoring the oil adsorbent for oil saturation.

Another aspect of the present invention is to provide a new and improved method and apparatus for separation of oil and water including a first gravity separation step that provides for separation of water and oil by settling to provide layering of the water in a layer below an oil layer and then draining the lower water layer from the upper oil layer, and thereafter directing at least a portion of the separated water layer through a vessel containing an oil adsorbent for contact with the oil adsorbent for removal (adsorption) of remaining hydrocarbons entrained with the drained water layer, while electronically monitoring the oil adsorbent for oil saturation, such as by installing an electrical conductivity sensor within the oil adsorbent, such that a measurement of electrical conductivity of the oil adsorbent indicates the extent of adsorption capacity remaining in the oil adsorbent.

Another aspect of the present invention is to provide a new and improved method and apparatus for separation of oil and water including a first gravity separation step that provides for separation of water and oil by settling to provide layering of the water in a layer below an oil layer and then draining the lower water layer from the upper oil layer, and thereafter directing the separated water layer through a vessel containing an organophilic media for pressurized contact with the organophilic media, at a pressure of about atmospheric, preferably at least 10 psig above atmospheric, for removal (adsorption) of remaining hydrocarbons entrained with the drained water layer.

The data of Table I show that, at atmospheric pressure and up to less than 10 psig water pressure entering the organophilic media-containing vessel, the effluent is cloudy and contains detectable levels of oil:

TABLE I

EFFECT OF PRESSURE ON OIL ADSORPTION BY ORGANOPHILIC CLAY

| Pressure | Influent Concentration and Color | Oil Concentration via EPA Method 413.1 | Color of Effluent |
| --- | --- | --- | --- |
| Atmospheric | 100 ppm, dark | 27 ppm | Cloudy, dark |
| 1 psig | 100 ppm, dark | 26 ppm | Cloudy, dark |
| 2 psig | 100 ppm, dark | 24 ppm | Cloudy, dark |
| 3 psig | 100 ppm, dark | 22 ppm | Cloudy, dark |
| 4 psig | 100 ppm, dark | 21 ppm | Cloudy, light |
| 5 psig | 100 ppm, dark | 20 ppm | Cloudy, light |
| 10 psig | 100 ppm, dark | 12 ppm | Clear |
| 15 psig | 100 ppm, dark | 8 ppm | Clear |
| 20 psig | 100 ppm, dark | 4 ppm | Clear |
| 25 psig | 100 ppm, dark | 1 ppm | Clear |
| 30 psig | 100 ppm, dark | 1 ppm | Clear |
| 35 psig | 100 ppm, dark | Non detect | Clear |
| 40 psig | 100 ppm, dark | Non detect | Clear |
| 45 psig | 100 ppm, dark | Non detect | Clear |
| 50 psig | 100 ppm, dark | Non detect | Clear |

The above and other aspects and advantages of the present invention will become more apparent from the following detailed description of the preferred embodiment read in conjunction with the drawings.

BRIEF DESCRIPTION OF THE DRAWINGS

FIG. 11 is an elevational view of a preferred embodiment of an organophilic media-containing cartridge shown in FIGS. 3 and 4;

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 1:
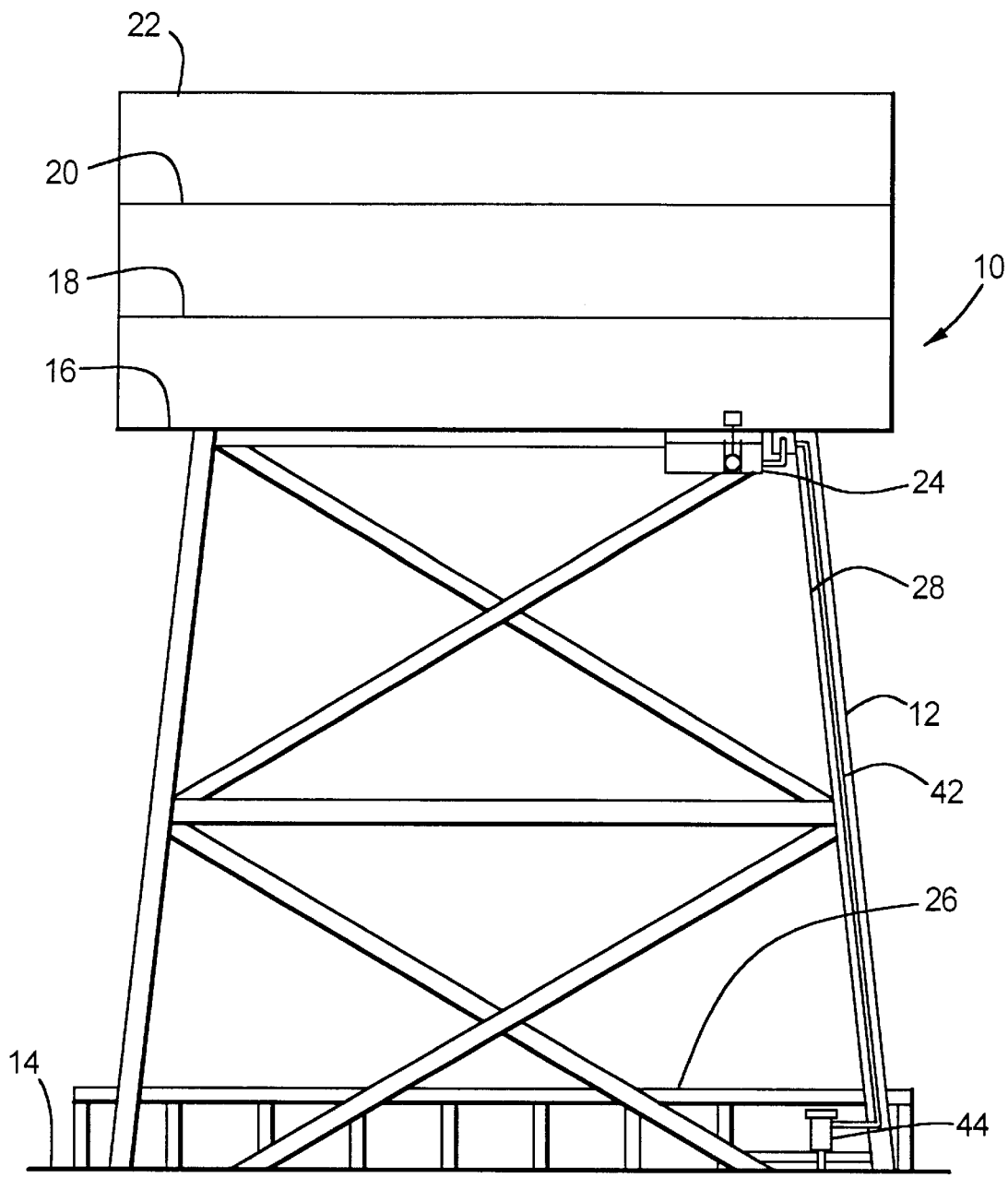
FIG. 1 is a side view of an offshore oil well drilling platform generally showing the oil and water separating apparatus and method of the present invention attached to a platform support structure with an alternative placement of a sump tank.

Turning now to the drawings, and initially to FIG. 1, there is shown an offshore drilling platform generally designated by reference numeral including a work deck support structure 12 for supporting a plurality of stacked work decks at a substantial height above an ocean water level 14. The work decks commonly include a cellar deck 16 at a lowest work deck level, a second deck 18 located directly above the cellar deck 16, a third deck 20 disposed directly above deck 18, and a main deck 22 at an uppermost work deck level. In extant offshore drilling platforms, a sump tank 24 has been connected to the drilling platform 10 at the cellar deck level 16 and rainwater, including entrained hydrocarbons, particularly oil, paraffins and surfactants have been directed from all deck levels, which are contained so that rainwater and entrained hydrocarbons do not spill over to the ocean, to drain by gravity into the sump tank 24. It has been found that further separation of hydrocarbons from rainwater is required for effective elimination of ocean water contamination by providing a secondary hydrocarbon recovery apparatus and method for organophilic media treatment of the rainwater separated by gravity in the sump tank 24 or 24A.

In accordance with a preferred embodiment of the present invention, it has been found that the apparatus and method of the present invention function best when the sump tank 24A is disposed on or near a boat landing deck level 26 (FIG. 1) of the offshore drilling platform 10. However, the sump tank can also be disposed at an upper level, in accordance with the present invention, as indicated by reference numeral 24 in FIG. 1.

In accordance with a preferred embodiment of the present invention, it has been found that the apparatus and method of the present invention function best when the oil-contaminated water treated in the organophilic media-containing vessel is pressurized above atmospheric pressure, preferably to at least about 10 psig, while in contact with the organophilic media. In accordance with an important feature of the present invention, when the contaminated water is pressurized to at least 5 psig, preferably to at least 10 psig, the effluent sent back to the ocean is clear (not cloudy) and has surprisingly less remaining oil as a result of pressurized contact of the oil-containing water with the organophilic media.

Pressurized contact of the oil-containing water with the organophilic media can be accomplished in a number of ways. One method of establishing pressurized contact of oil-contaminated water with the organophilic media, when used on an offshore drilling platform, is by placement of sump tank 24A at the cellar deck level 16, and by securing the organophilic media-containing cartridge 44 at or near the boat landing deck level 26 (such that at least a portion of the organophilic media-containing cartridge 44 is within about 10 feet of ocean level). Oil and other hydrocarbons collected on the production decks 16, 18, 20 and 22 that may accumulate during dry weather on the inner surfaces of the conduit 28 and inner surfaces of sump tank 24 can be separated from the water that flows from the decks to the organophilic media-containing cartridge 44 for recovery and separation in accordance with the apparatus and method of the present invention.

Figure 2:
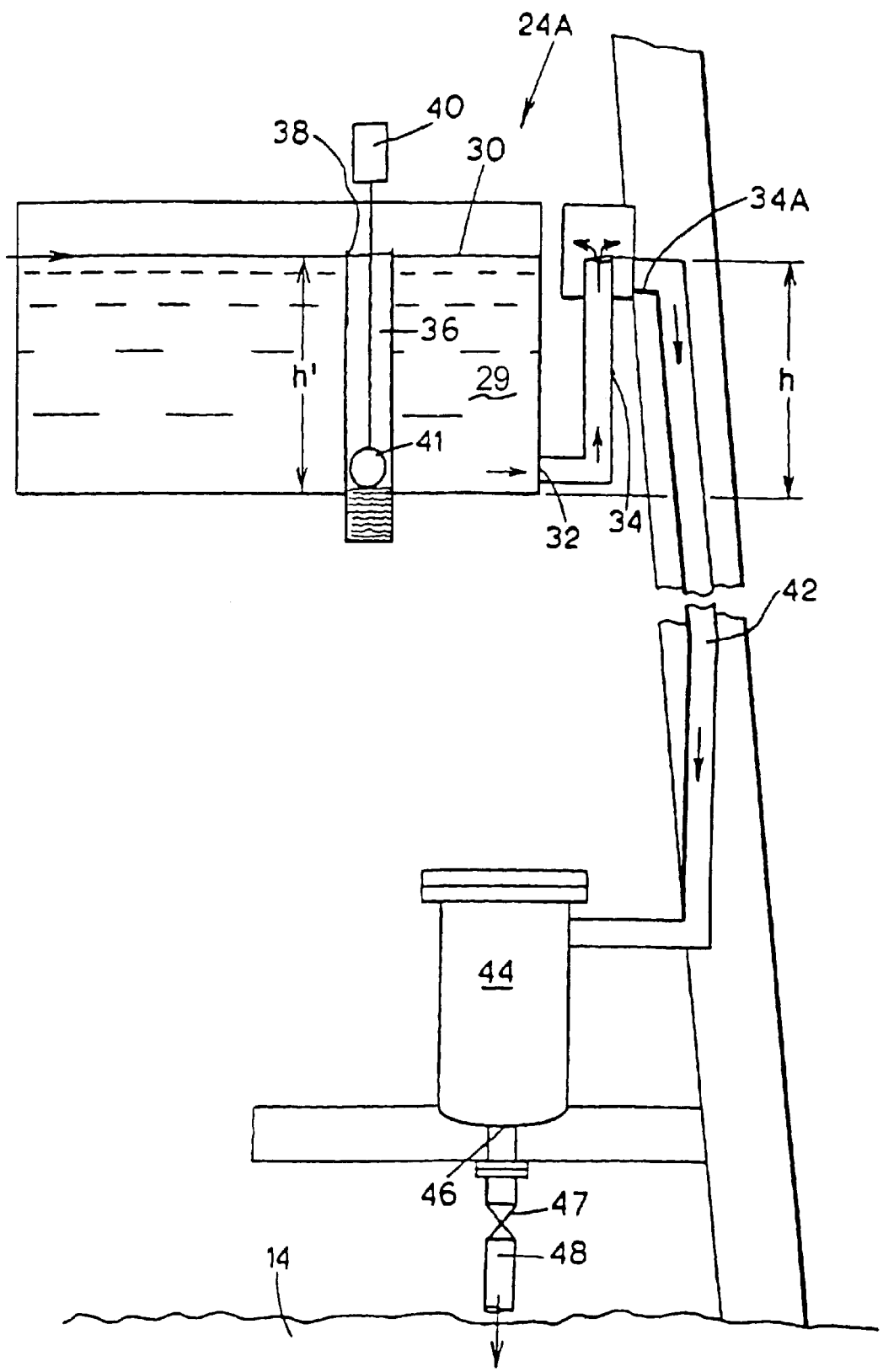
FIG. 2 is a side view of one embodiment of an oil and water separating apparatus and method of the present invention.
Figure 3:
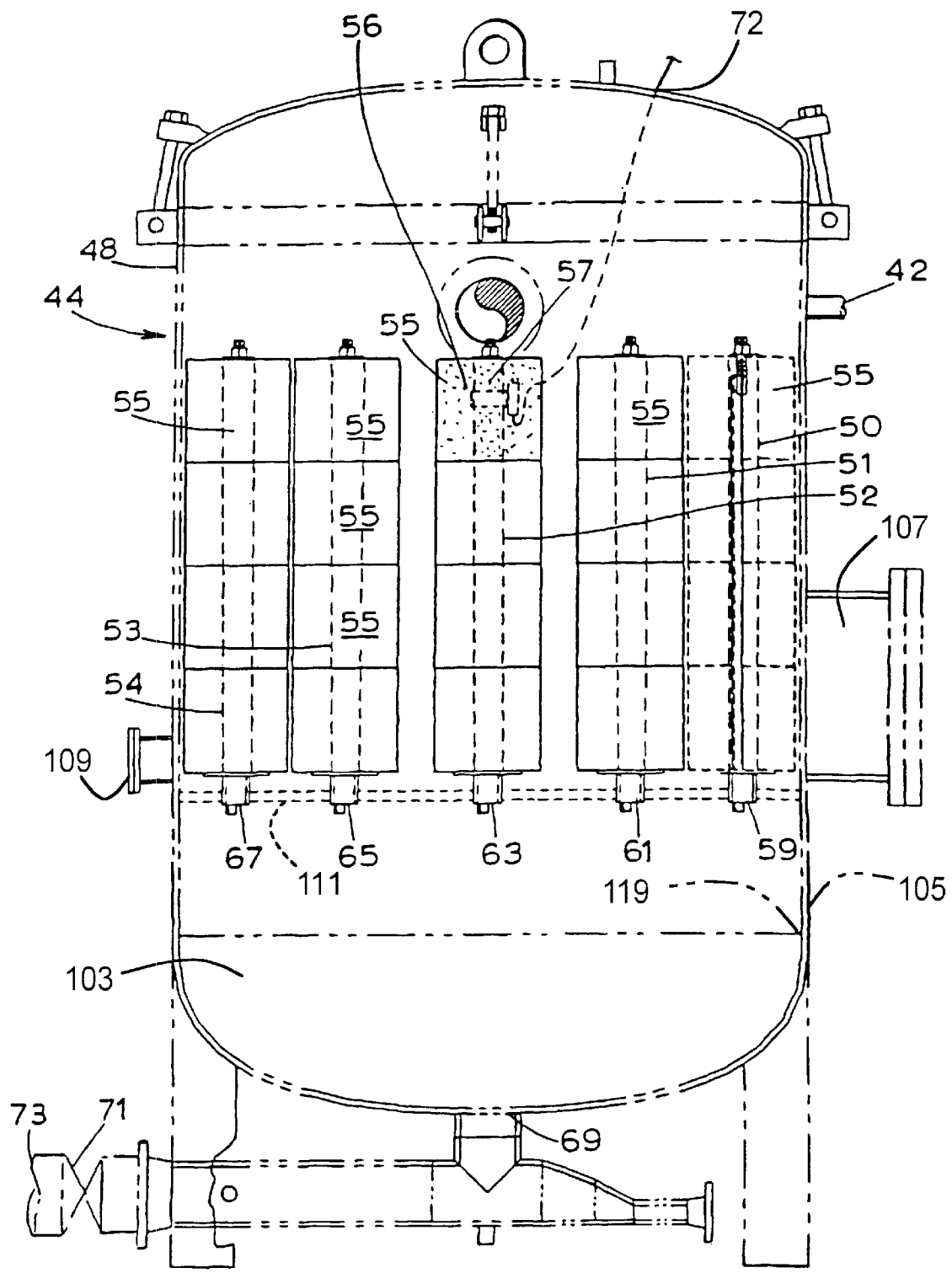
FIG. 3 is a sectional view of an embodiment of a vessel containing a plurality of organophilic media-containing cartridges for efficient contact of hydrocarbon-containing water with an organophilic media contained therein.

Other expedients for establishing pressure within the organophilic media-containing cartridge 44 include installing a valve 47 (FIG. 2), or 71 (FIG. 3) or other restrictions in the effluent conduit 48 (FIG. 2) or 73 (FIG. 3).

Water and entrained hydrocarbons are conveyed via conduit 28 from the deck areas 16, 18, 20 and 22 along the platform infrastructure or support leg 12 down to the sump tank 24 or 24A, preferably sump tank 24A, for convenient servicing and/or organophilic media cartridge replacement.

Although placement of sump tank 24A at this level has not been expedient with prior art sump tank gravity water/oil separation, it is now expedient to dispose the water/oil separation apparatus of the present invention at or near the boat landing deck level 26 (such that at least a portion of the sump tank 24A is within about 10 feet of ocean level) since oil and other hydrocarbons collected on the production decks 16, 18, 20 and 22 that may accumulate during dry weather on the inner surfaces of the conduit 28 and inner surfaces of sump tank 24A can be separated from the water that flows from the decks to the sump tank 24A for recovery and separation in accordance with the apparatus and method of the present invention.

Turning now to FIG. 2, there is shown another embodiment of the hydrocarbon separation apparatus of the present invention that includes a gravity separation sump tank 24A for gravity separation of a lower level of water 29 from a floating layer of oil 30. The water 29 is conveyed through a water outlet 32 disposed near a bottom of the sump tank 24A through a water leg 34 in the shape of an inverted U. The water leg 34 achieves gravity flow of water through the water leg 34 only when the level of water within the sump tank 24A reaches height h, above an uppermost or base portion 34A of water leg 34. The sump tank 24A includes an inner, contained float valve housing 36 open at its top 38 for receiving oil from oil level 30 when the level of liquid within the sump tank 24 reaches height h'. Float valve 40 is disposed within inner housing 36 and is connected to a pump (not shown) for pumping oil into an oil recovery vessel when a floating ball portion 41 of float valve 40 rises to a predetermined level within inner valve housing 36 as a result of oil entering inner vessel 36 when the liquid level h' is reached within sump tank 24A. While h and h' are shown to be approximately equal, h may be smaller than h' in order to achieve water removal without oil pumping, as well known in the art.

In accordance with an important feature of the present invention, a downwardly extending leg portion 42 of water leg 34 is operatively interconnected to, and in fluid communication with, one or more sump water polishing units 44 containing a volume of oil adsorbent, particularly an organophilic media. The separated water flows by gravity through water leg conduit 42 and is conveyed through conduit 42 into sump water polishing unit 44 containing organophilic media. The organophilic media within sump water polishing unit 44 adsorbs the hydrocarbons, oil and other organic materials entrained with the water flowing through conduits 42 and 44 for essentially complete hydrocarbon removal (less than about 10 parts per million, preferably less than about 1 part per million organics after organophilic media treatment). The treated water flows by gravity through water exit opening 46 in the sump water polishing unit 44 and through exit conduit 48 back to the ocean water 14.

It will be noted that FIG. 2 is a simplified drawing of an actual apparatus which, preferably, would include a plurality of vessels 44 connected downstream of one or more sock filters (not shown). The vessels 44 would also be connected upstream of one or more activated charcoal filters (not shown) or other suitable filter as a final polishing step before the water is returned to the ocean. Such sock filters and activated charcoal or carbon filters are well known to those skilled in the art.

Figure 6:
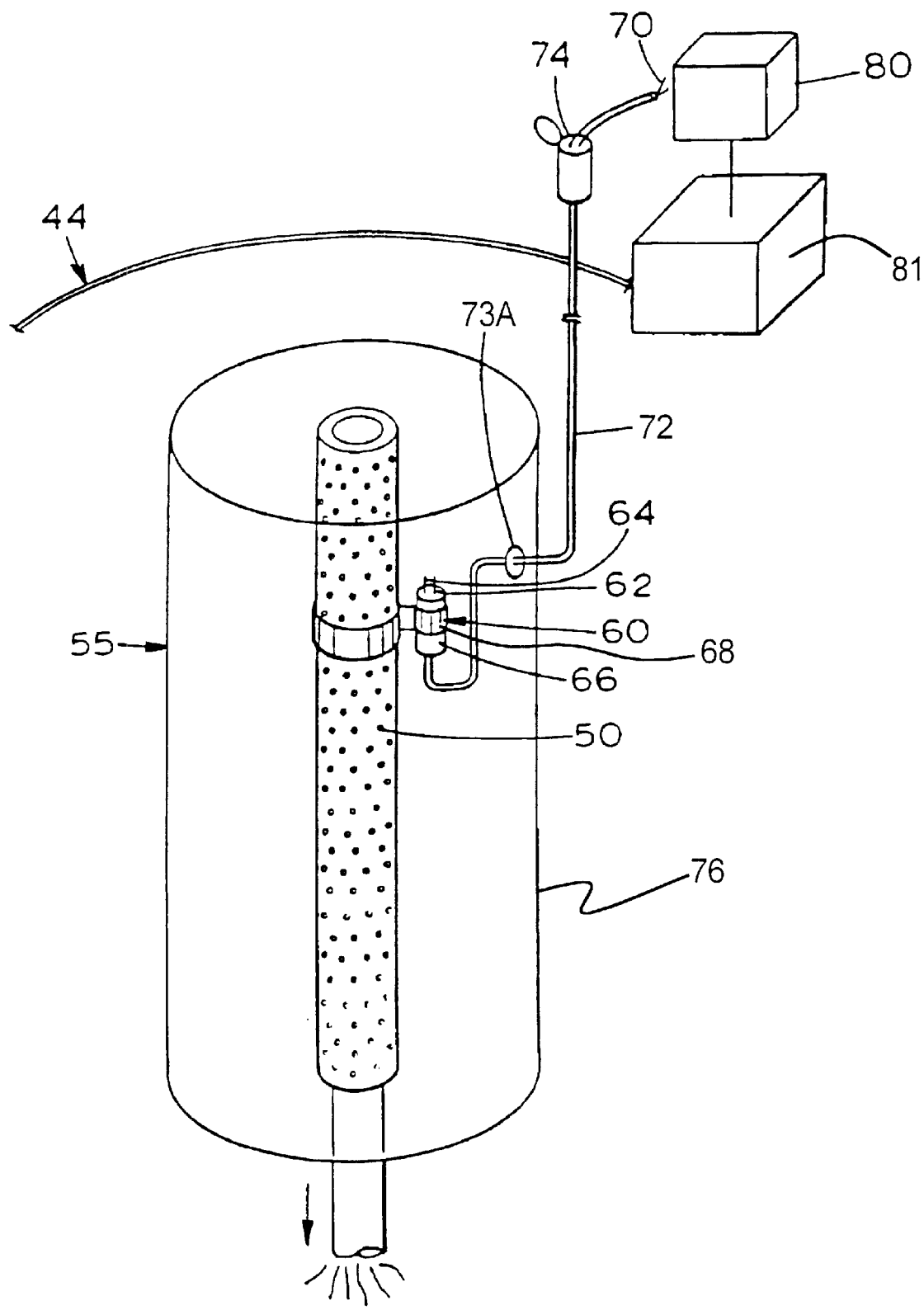
FIG. 6 is a partially broken-away side view of an embodiment of a sump water polishing unit of the present invention, containing multiple, stacked cartridges (FIGS. 3 and 4), wherein one of the cartridges is equipped with a probe for indicating when the cartridge becomes saturated, or nearly saturated, with hydrocarbons, so that the sump water can be directed into another polishing unit while cartridges are replaced.
Figure 7:
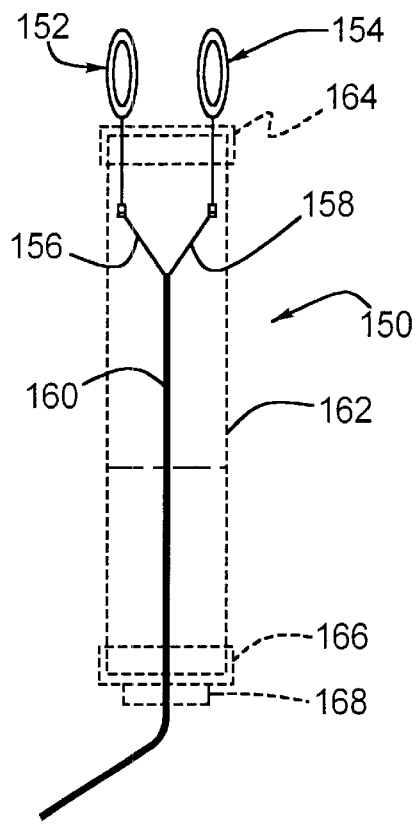
FIG. 7 is a sectional elevational view of a preferred embodiment of a probe for placement within an organophilic media-containing filter cartridge which provides a signal indicating when the media of said cartridge is sufficiently contaminated or saturated with hydrocarbon so as to need replacement or regeneration.
Figure 8:
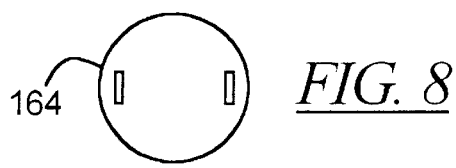
FIG. 8 is a top plan view of the top cap of the probe shown in FIG. 7.
Figure 9:
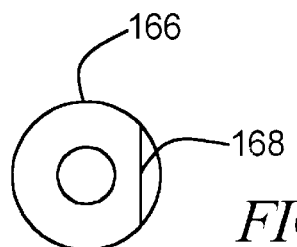
FIG. 9 is a bottom plan view of the bottom cap of the probe shown in FIG. 7.

As shown in FIGS. 3 and 6, the sump water polishing unit 44 includes an outer, fluid-impermeable housing 48 having a water inlet 42 interconnected through the housing 48 so that contaminated water enters the polishing unit 44 and then enters the organophilic media-containing vessels or cartridges 55, through a plurality of apertures 56. The organophilic media-containing cartridge 55 is water-permeable by virtue of the water flow apertures 56 that are sized sufficiently small such that organophilic media granules do not pass therethrough. Water entering the polishing unit 44 through water inlet conduit 42 and apertures 56 flows radially inwardly into longitudinal, axial, central conduits 50, 51, 52, 53 and 54, each containing treated water-receiving apertures 57 for receiving the organophilic media-treated water. Organophilic media contained in cartridges 55 adsorbs any oil and organics contained in the water and the clean water exits through exit openings 59, 61, 63, 65 and 67 in each stack of cartridges 55 and the clean water collectively exits the housing 48 through exit conduit 69 and through valve 71 and then is returned to the ocean via outlet 73.

Figure 4:
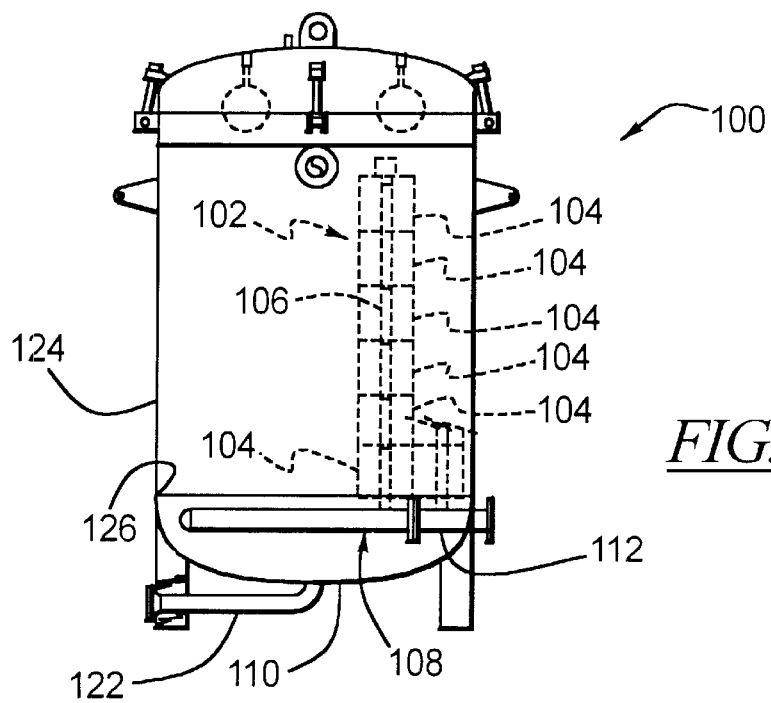
FIG. 4 is an elevational view of a preferred embodiment of a vessel containing a plurality of organophilic media-containing cartridges for efficient contact of hydrocarbon-containing water with organophilic media contained within the cartridges.

Turning to FIG. 4, another embodiment of a vessel 100 containing stacks of cartridges, one of which is shown at 102. Each cartridge stack includes a plurality of annular cartridges 104 through which a porous conduit 106 extends. The porous conduit 106, instead of being connected to a porous tube sheet 111 as shown in FIG. 3, instead is connected to a header 108 which is disposed within a bottom section 110 of the vessel 100.

Figure 5:
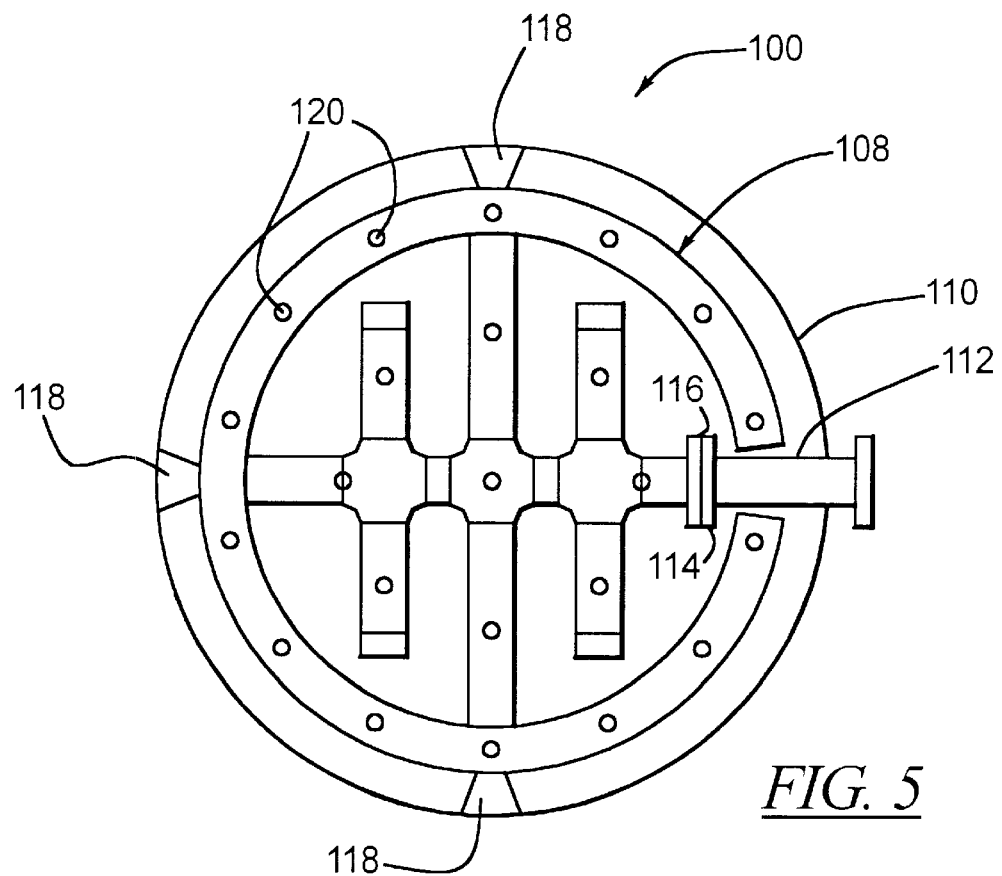
FIG. 5 is a top plan view of the header of the vessel shown in FIG. 4 and openings within the header for receiving permeable conduits each of which can extend through a stack of filter cartridges as shown in FIGS. 3 and 4.

Turning to FIG. 5, the header 108 is connected to a filtered water outlet 112 which includes a flange 114 which is connected to the flange 116 of the header 108 by a plurality of fasteners, such as bolts (not shown). The header is also supported within the vessel, or more specifically, within the bottom structure 110 (see FIG. 4) of the vessel by a plurality of supports shown at 118. The header 108 includes a plurality of openings 120, each of which receives a permeable conduit 106 (see FIG. 4). In the embodiment illustrated in FIGS. 4 and 5, the header 108 is connected to 23 permeable conduits and therefore supports 23 stacks of cartridges 104. By providing the header 108 within the bottom structure 110 of the vessel 100, the permeable tube sheet 111 shown in FIG. 3 is eliminated and the bottom section 110 of the vessel can be used to collect accumulated solids, or solids which do not pass through the outer covers of the filter cartridges 104. A drain 122 is provided for purposes of flushing out the accumulated solids which settle in the bottom structure 110 of the vessel 100. In contrast, as shown in FIG. 3, solids will accumulate on top of the tube sheet 111. Thus, the solids must be removed from above the tube sheet 108 using one or more nozzle openings shown at 109 in FIG. 3. As shown in FIG. 4, these additional nozzle openings are not required in the vessel 100 because the accumulated solids are easily flushed down the drain pipe 122.

Further, by utilizing the header 108 and eliminating the tube sheet 111, the interior space of the vessel 100 is more efficiently utilized. Specifically, a greater proportion of the interior volume of the vessel 100 is available for stacking cartridges 104. In contrast, the design shown in FIG. 3 requires the cartridges to be stacked on top of the tube sheet 111 and the filtered water to be collected in the bottom area 103 before flowing out through the exit conduit 69.

Still further, the construction of the vessel 100 facilitates both the assembly and the painting or the application of protective coating to the inside of the vessel 100. Specifically, the bottom structure 110 is equipped with the drain 122 and the filtered water outlet 112. The bottom structure 110 can then be welded to the cylindrical portion 124 of the vessel 100. At this point, the inside surfaces of the cylindrical section 124 and the bottom structure 110 can be painted with a protective coating to prevent rust and corrosion caused by salt water and/or acidic water. The welding seam shown at 126 can be easily coated with the protective coating.

In contrast, the vessel 44 of FIG. 3 requires additional painting steps depending upon when the tube sheet 111 is installed in the cylindrical section 105 of the vessel 44. Specifically, both sides of the tube sheet must be coated with the protective material. After the bottom structure 103 is installed and welded onto the cylindrical section 105, the weld seam 119 must be coated. Thus, the additional openings 109 and manway opening 107 are provided to make the necessary repairs to the inside surface of the vessel 44 along the weld seam.

The preferred coating material for the vessels used to separate hydrocarbon contaminants from water or non-acidic water are modified epoxy phenolic materials. For example, a material sold under the trademark CARBOLINE, Product No.187-0500 is a suitable material for a first coat for the vessels 44, 100 and a material also sold under the trademark CARBOLINE, Product No.187-C703 is suitable as a second coat. For vessels used in acid flow back operations, the preferred coating materials are mica filled novalac vinyl esters. A suitable material for a first coat is sold under the trademark SENTRY POLYMERS, Product No. 5302-HT and a suitable material for a second coat is also sold under the trademark SENTRY POLYMERS, Product No. 5302-HT.

As shown in FIG. 5, an extremely dense number of stacks of cartridges 104 is provided by the header 108. Specifically, the header 108, as shown in FIG. 5, includes 23 openings 120, and therefore 23 porous conduits 106 and therefore 23 stacks 102 of cartridges 104. Accordingly, the volumetric flow rate that can be handled by the vessel 100 is substantially greater than the volumetric flow rate that can be handled by the vessel 44. Of course, smaller vessels with fewer stacks of cartridges and large vessels with more stacks of cartridges are anticipated.

Organophilic Clay

The terms "organophilic clay" and "organoclay" are used herein interchangeably to refer to various types of clay, e.g., smectites, that have organoammonium ions substituted for cations between the clay layers. The term "organoammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite-type clays, particularly the smectite-type clays that have a cation exchange capacity of at least 75 milliequivalents per 100 grams of clay. Useful clays for such purpose include the naturally occurring Wyoming variety of swelling bentonite and similar clays, and hectorite, which is a selling magnesium-lithium silicate clay. The clays are preferably converted to the sodium form if they are not already in this form. This can be effected by a cation exchange reaction with a soluble sodium compound. These methods are well-known in the art. Smectite-type clays prepared synthetically can also be utilized, such as montmorillonite, bentonite, beidelite, hectorite, saponite, and stevensite.

The organoclays useful in this invention also include those set forth in U.S. Pat. No. 2,531,427 to Hauser. These organoclays are modified clays which exhibit inorganic liquid, some of those characteristics that untreated clays exhibit in water. For example, they will swell in many organic liquids and will form stable gels and colloidal dispersions.

Generally, the quaternary ammonium salt substituted onto the clay has organic groups attached to the clay that will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 aromatic substituents per aliphatic substituent (i.e., dimethyl dioctododecyl 0:2, methyl benzyl dioctododecyl 1:2, dibenzyl dioctobenzyl 1:1, tribenzyl octadecyl 3:1, and methyl dibenzyl octodecyl 2:1). The amount of quaternary ammonium salt substituted on the clay can vary between 0.5% to 50% by weight.

Preferred organoclays useful in the invention comprises one or more of the following types of quaternary ammonium cation-modified montmorillonite clays:

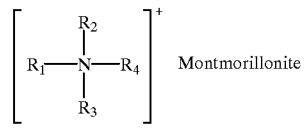

wherein $R_1$ is an alkyl group having at least 10 carbon atoms and up to, for example, 24 atoms, and preferably having a chain length of from 12 to 18 carbon atoms; $R_2$ is hydrogen, benzyl, or an alkyl group of at least 10 carbon atoms and up to, for example, 24 carbon atoms, and preferably from 12 to 18 carbon atoms; and $R_3$ and $R_4$ are each hydrogen or lower alkyl groups, i.e., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(hydrogenated tallow) ammonium bentonite; and more generally quaternary ammonium cation modified montmorillonite clays represented by the formula:

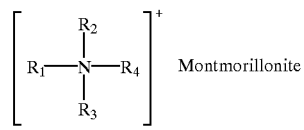

wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, and most preferably wherein 20% to 35% of said long chain alkyl radicals contain 16 carbon atoms and 60% to 75% of said long chain alkyl radicals contain 18 carbon atoms.

The montmorillonite clays that may be so modified are the principal constituents of bentonite rock, and have the chemical compositions and characteristics described, for example, in Berry & Mason, "Mineralogy," 1959, pp. 508–509. Modified montmorillonite clays of this type (i.e., organoclays) are commercially available from Southern Clay Products, Inc., Gonzales, Tex. under such trade designations as CLAYTONE 34 and 40, and are available from NL Industries, Inc., New York, N.Y. under such trade designations as BENTONE 27, 34, and 38. Other organoclays useful in the invention are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methyl bis(2-hydroxyethyl)octodecyl ammonium bentonite.

Oil-Adsorption Monitoring Probes

The organophilic clay adsorbs oil, grease and other hydrocarbon contaminants and, after a period of time, which depends upon the flow rate and hydrocarbon contamination level of the liquid contacting the organophilic clay, the clay becomes "spent", or saturated with hydrocarbons to an extent that the clay cannot further adsorb hydrocarbons to an extent that the effluent can be legally disposed of back into the ocean. Presently, the regulations do not permit water to be returned to the ocean if it contains more than 29 ppm hydrocarbons. When the organophilic clay becomes spent, the water/oil mixture is directed from the cannister containing the spent clay and flow is contained through a cannister containing fresh or regenerated organophilic clay.

In accordance with a preferred embodiment of the present invention, it has been found that the organophilic clay within one or more canisters 54 can be electronically monitored, continuously, or periodically, to detect when the organophilic clay is spent, or almost spent, e.g., within a short safety factor of becoming spent, so that the water flow can be directed into another cannister while regenerating or replacing the spent organophilic clay.

A waterproof probe 60 (FIG. 6), having two diametrically opposed non-corrosive hollow circle conductor plates 62 and 64 extending from a probe body 66, is embedded in the organophilic clay within one or more of the filter cartridges 55. The hollow circle probe conductor plates 62 and 64 are at a "fixed" distance from each other "d", e.g., from ½" to 1" apart. The probe conductor body 66 preferably will be about 1" to 4" in length and extend from a probe support structure 68. The probe support structure 68 will be affixed to a central, treated-water outlet conduit 50, 51, 52, 53 or 54 of the cartridges 55 (see FIG. 3). Electrical wires 70 encased in a watertight jacket 72 will extend from the probe body 66 and penetrate through a cable gland 73A mounted in a cover 76 of cartridge 55 through a packing gland connector 74. A cable jacket 72 provides a waterproof seal around the electrical wires 70 and extends up from cartridge 55 through the packing gland connector 74 and wires 70 will provide for conveyance of an electrical signal from the probe 60 through the cartridge 55 that houses the organophilic clay and, in a preferred embodiment, will convey the electrical signal to a nearby probe junction box 80 which then connects to a control/alarm panel 81.

It is estimated that a maximum of three probes per sump water polishing unit (one per stack of cartridges 55) would provide adequate sampling to determine the adsorbed condition of organophilic clay in all of the canisters. After proper electrical connections have been accomplished, DC power is applied to the control/alarm panel 81 at a desired voltage. A precision calibrated signal is applied to the probes 60. When sea water or other non-hydrocarbon-contaminated reference water floods the cartridges 55, a measurement reference is established. The precision voltage/frequency signal applied to the probes 60 may vary from a very low frequency bipolar wave up to a frequency in the "ultrasonic" range.

As the organophilic clay begins to adsorb oil from the oily water flowing through the cannister, the sea water is displaced and squeezed away from the electrical path of the hollow circle probe plates 62 and 64. The conductance/resistance reference established from non-hydrocarbon-contaminated water, e.g., sea water, flow is compared to the data measured as the oil is accumulatively adsorbed by the organophilic clay. Over time, the dielectric conductance/resistance path changes—the conductance decreases and the resistance increases. The electrical path between the hollow circle probe plates 62 and 64 slowly changes to a higher "dielectric" value, whereas the probe plates, dielectric and fixed distance between the plates 62 and 64 now become a "capacitor". The resulting wave shape and/or signal level produced by the capacitance and/or conductance of the media (hydrocarbon-containing seawater) is evaluated by the control/alarm panel 81. If the wave shape and/or signal level meet a predetermined criteria, the control circuitry of the panel 81 will issue an alarm signal (digital or analog) that can be audible and/or visual and can signal any telemetry or supervisory control and data acquisition (SCADA) system.

Figure 10:
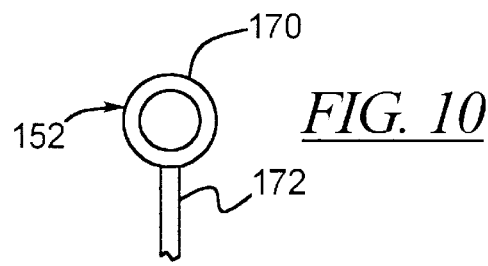
FIG. 10 is an elevational view of one of the elements of the probe shown in FIG. 7.

A preferred embodiment of a probe 150 is illustrated in FIGS. 7–10. Specifically, the probe body 150 includes two spaced apart elements 152, 154. Each hollow circle probe tip element 152, 154 is connected to its own wire lead 156, 158. The wire leads, which are insulated from one another, extend through a protective jacket 160 and are connected to a probe junctionbox 80 and then connected to a control panel as shown in FIG. 6. The elements 152, 154 extend into the probe body 162 and are supported by a top cap 164. A bottom cap is shown at 166 which includes a key 168 for ensuring that the probe is properly aligned within the canister 104. Specifically, the probe is aligned so that the hollow circle probe tips 152, 154 are aligned parallel to the radial flow of fluid through the canister. Orthogonal alignment of the hollow circle probe tips 152, 154 to the radial flow compromises the performance of the probe. The hollow circle probe tip design allows fall circulation of sea water through and around the surface area of the probe tips enabling a reliable measurement sample of the media. As shown in FIG. 10, each probe preferably includes a hollow circle portion 170 connected to a downwardly protruding shaft 172. The preferred material for the elements 152, 154 is 316 stainless steel. Another suitable material is Hasteloy/Incanel. The probe body tube 162, top cap 164 and bottom cap 166 are made from Hylar thermoplastic fluoropolymer. The probe tube 162 is about two-thirds filled with a potting compound. One suitable potting compound is sold by the Minnesota Mining and Manufacturing Company under the trademark DP270 (Black Potting Compound).

Figure 14:
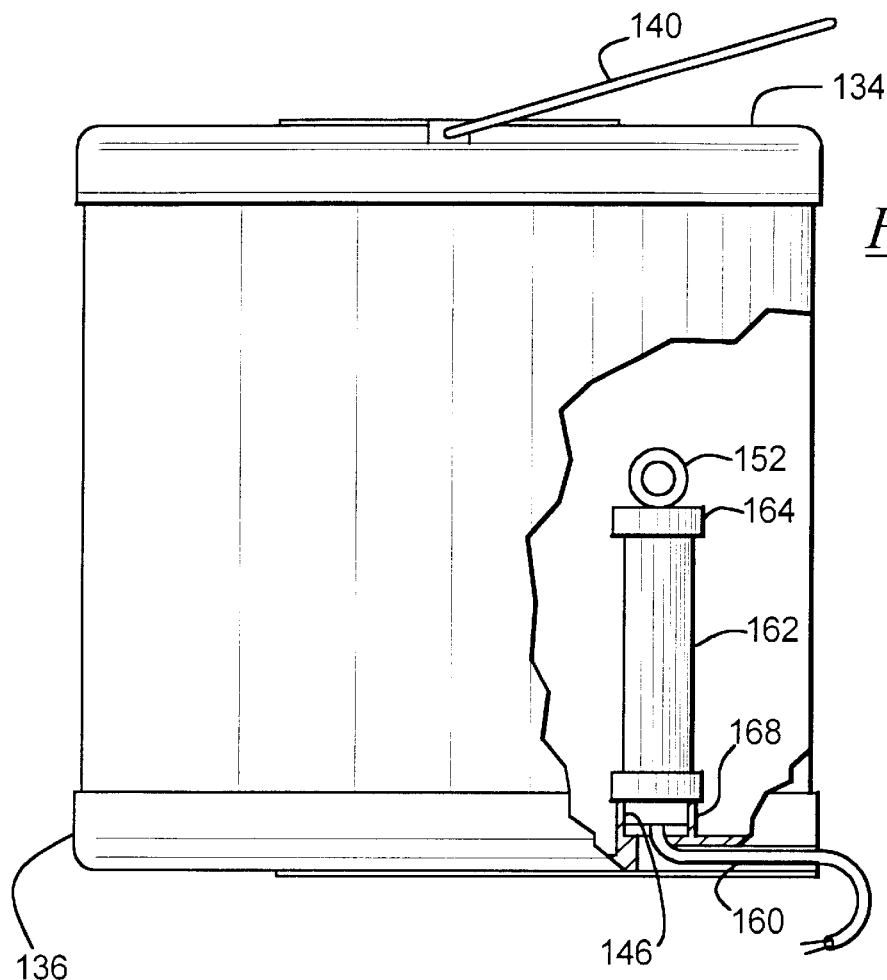
FIG. 14 is a partial side plan view of a filter canister illustrating the position of a probe therein.
Figure 12:
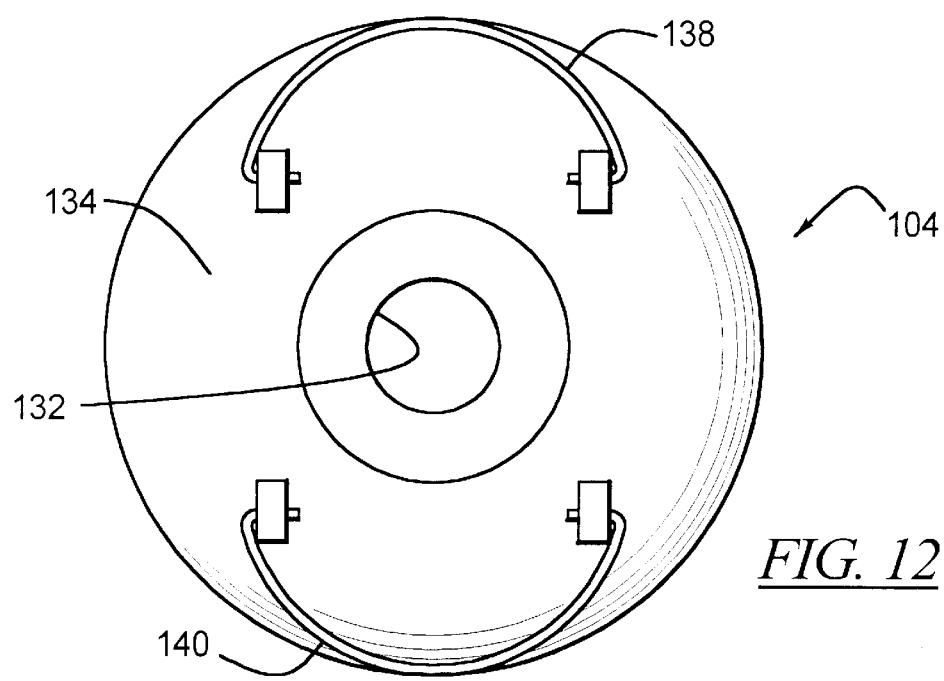
FIG. 12 is a top plan view of the organophilic media-containing cartridge shown in FIG. 11.

FIGS. 11, 12 and 14 illustrate a typical filter cartridge 104. Each cartridge includes a permeable outer cover 130, a permeable inner tube 132, an annular top 134 and an annular bottom 136. The space defined by the cover 130, tube 132, top 134 and bottom 136 is filled with organophilic clay. Handles 138, 140 are provided to facilitate the removal of the cartridges 104 from the conduits 106 for regeneration of the clay or replacement of the cartridges 104.

Figure 13:
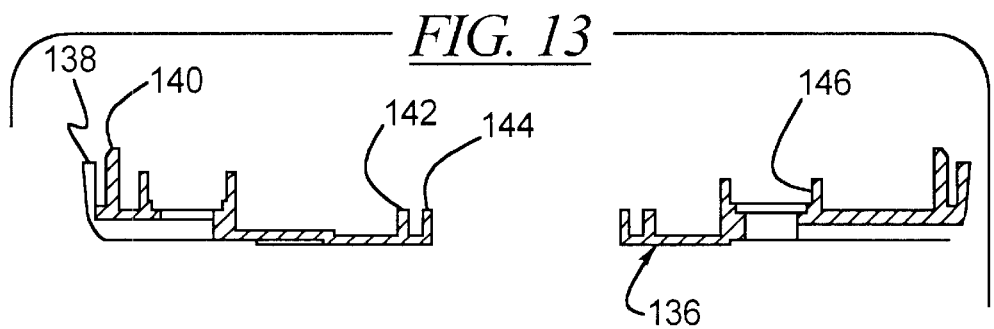
FIG. 13 is a sectional view of an annular bottom plate of an organophilic media-containing filter cartridge made in accordance with the present invention.

FIG. 13 is a sectional view of an annular bottom plate of a cartridge 104. The outer cover 130 is accommodated between the lips 138, 140. The inner tube 132 is accommodated between the lips 142, 144. The probe 150 for evaluating the condition of the clay, or the fluid flowing through the cartridge 104 is received in the opening 146.

From the above description, it is apparent that the objects and advantages of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A method of separating water from a liquid comprising a combination of water and a hydrocarbon contaminant comprising:

flowing the liquid into a filtration vessel comprising an outlet, a header connected to the outlet, and at least one permeable conduit connected to the header, the conduit passing through a plurality of cylindrical cartridges, each cylindrical cartridge comprising a permeable outer cover and a permeable inner tube, the cartridge containing an organophilic media between the outer cover and the inner tube, the media providing intimate contact with the liquid and adsorption of the hydrocarbon contaminant on the media;

providing a pressure within the filtration vessel of greater than atmospheric; and flowing the separated water through the conduit, through the header and out through the outlet.

2. The method of claim 1 wherein at least one of the cartridges containing a probe comprising two spaced apart elements for monitoring a property of the liquid flowing through the media, the elements being aligned parallel to the radially inwardly flow of the liquid, and the method further comprises:

transmitting a signal from one of the elements to the other of the elements to measure a property of the liquid flowing between the elements; and monitoring the property whereby a change in the property provides a measure of remaining hydrocarbon adsorbance capacity of the media.

3. The method of claim 2, wherein the elements are conductive and the signal is bipolar voltage at a given frequency and the property is resistivity or conductivity.

4. The method of claim 2, further including means for providing a visual or audible signal when the remaining hydrocarbon adsorbance capacity reaches a predetermined minimum value.

5. The method of claim 1, wherein the filtration vessel comprises a plurality of permeable conduits extending within the housing, each of the conduits being connected to the header, the conduits extending upward from the header and within the housing, each conduit passing through at least one cartridge.

6. The method of claim 1, wherein the header is detachably connected to the outlet.

7. The method of claim 2, wherein the elements comprise a pair of metallic hollow circle tips each connected to a separate electrical conducting wire for conducting an electrical signal to a visual or an audible control panel to provide a visual or audible signal from which a relative degree of remaining adsorbance capacity of hydrocarbons in the organophilic media can be determined.

8. The method of claim 3, wherein the elements are made from stainless steel.

9. The method of claim 3, wherein the elements are made from Hasteloy/Incanel.

10. The method of claim 2, wherein the property of the liquid/media that is monitored is selected from the group consisting of the electrical conductance and the electrical resistance thereof.

11. The method of claim 4, wherein a pressure within the vessel is at least 5 psig.

12. The method of claim 7, wherein a signal proportional to the electrical conductance or electrical resistance of sea water is first determined as a base point in determining the change in electrical conductance or electrical resistance necessary before regeneration or replacement of the organophilic media is effected.

13. The method of claim 2, further comprising:

collecting the hydrocarbon and water in a settling vessel and allowing the hydrocarbon and water to settle to form a lower water layer and an upper hydrocarbon layer, the lower water layer including a portion of the hydrocarbon contaminant; and draining a portion of the water layer from the settling vessel, prior to flowing the lower water layer, including the hydrocarbon contaminant into the filtration vessel.

14. The method of claim 13, wherein the property of the drained portion of the water layer that is monitored is selected from the group consisting of the electrical conductance and the electrical resistance thereof.

* * * * *